US009602030B2

(12) United States Patent
Chen

(10) Patent No.: US 9,602,030 B2
(45) Date of Patent: Mar. 21, 2017

(54) MOTOR DRIVE CIRCUIT AND MOTOR THEREOF

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 13 days.

(21) Appl. No.: 14/872,196

(22) Filed: Oct. 1, 2015

(65) Prior Publication Data

US 2016/0380565 A1 Dec. 29, 2016

(30) Foreign Application Priority Data

Jun. 26, 2015 (TW) ............................ 104120704 A

(51) Int. Cl.
*H02P 6/08* (2016.01)
*H02P 21/00* (2016.01)
*H02P 6/14* (2016.01)

(52) U.S. Cl.
CPC ................ *H02P 6/085* (2013.01); *H02P 6/14* (2013.01); *H02P 21/0003* (2013.01)

(58) Field of Classification Search
CPC .......... H02P 6/085; H02P 6/14; H02P 21/003; H02P 6/08; H02P 6/10
USPC ............ 318/504, 503, 400.24, 400.25, 400.3
See application file for complete search history.

(56) References Cited

U.S. PATENT DOCUMENTS 4,047,083 A * 9/1977 Plunkett ................ H02M 7/527 318/807
4,227,128 A * 10/1980 Cockroft ................ H02P 25/10 200/80 R
4,611,158 A * 9/1986 Nagase ................ H02M 7/527 318/798
7,348,758 B2 * 3/2008 Ho .................... H02M 7/53875 318/599
7,391,180 B2 * 6/2008 Armiroli ................ B60K 6/485 180/65.1
8,339,076 B2 * 12/2012 Aoki .................. G01D 5/24452 318/400.04

* cited by examiner

*Primary Examiner* — Rita Leykin
(74) *Attorney, Agent, or Firm* — Li & Cai Intellectual Property (USA) Office

(57) ABSTRACT

The present disclosure illustrates a motor drive circuit. The motor drive circuit includes a resistor module, a multiplexer, a data control unit, an analog-to-digital converter and a register. The resistor module receives an input voltage and generates at least one parameter voltage. The parameter voltage is associated with a motor speed curve of a motor. The multiplexer receives the parameter voltage. The data control unit controls the multiplexer to output the parameter voltage. The analog-to-digital converter receives the parameter voltage and converts the parameter voltage to digital form, and then outputs the digital parameter voltage to the data control unit. The register stores the digital parameter voltage outputted by the data control unit. A controller determines the motor speed curve according to the digital parameter voltage stored in the register, and drives the motor in response to the motor speed curve.

12 Claims, 4 Drawing Sheets

MOTOR DRIVE CIRCUIT AND MOTOR THEREOF

BACKGROUND

1. Technical Field

The present disclosure relates to a motor drive circuit, in particular, to a motor drive circuit which can record parameters associated with an operation of a motor, and the motor using the same.

2. Description of Related Art

With the development of technology, motors have become essential electric devices in society. The common motors, such as DC motors, AC motors, step motors and the like, have been widely used for driving fans.

In order to drive the motor, the motor driving chip comprises a Hall sensor. The Hall sensor outputs the timing signal to the control circuit according to the working state of the motor, such as the current direction and the current amount of the coil of the motor. The control circuit controls the conducting states of each switch in the full-bridge circuit according to the timing signals and the pulse width modulation signals, which makes the permanent magnet of the motor rotator and the coil attract or repel with each other. Thereby, the motor can drive the fans to rotate.

However, a noise is generated during the motor rotator switching phase, such as switching from N pole to S pole. The noise influences the parameters inputted into the motor, which makes a rotation speed of the motor unstable. Hence, a motor is provided to overcome the influences from the noise and provide a stable rotation speed.

SUMMARY

An exemplary embodiment of the present disclosure provides a motor drive circuit. The motor drive circuit comprises a resistor module, a multiplexer, a data control unit, an analog-to-digital converter and a register. The multiplexer is coupled to the resistor module. The data control unit is coupled to the multiplexer. The analog-to-digital converter is coupled to the multiplexer and the data control unit. The register is coupled to the data control unit. The resistor module is configured for operatively receiving an input voltage, and generating at least one parameter voltage. The parameter voltage is configured for operatively determining a motor speed curve of a motor. The multiplexer is configured for operatively receiving the parameter voltage. The data control unit is configured for operatively controlling the multiplexer to output the parameter voltage. The analog-to-digital converter is configured for operatively receiving the parameter voltage and converting the parameter voltage to digital form, and then outputting the digital parameter voltage to the data control unit. The register is configured for operatively storing the digital parameter voltage outputted by the data control unit. A controller determines the motor speed curve according to the digital parameter voltage stored in the register, and drives the motor in response to the motor speed curve to avoid a noise generated during a rotation of the motor interfering with the motor. After the register stores the digital parameter voltage, the data control unit outputs a switch signal to the controller, such that the controller enters an operation mode.

An exemplary embodiment of the present disclosure provides a motor. The motor comprises a motor drive circuit and a controller. The motor drive circuit is coupled to the controller. The motor drive circuit comprises a resistor module, a multiplexer, a data control unit, an analog-todigital converter and a register. The multiplexer is coupled to the resistor module. The data control unit is coupled to the multiplexer. The analog-to-digital converter is coupled to the multiplexer and the data control unit. The register is coupled to the data control unit. The resistor module is configured for operatively receiving an input voltage, and generating at least one parameter voltage. The parameter voltage is configured for operatively determining a motor speed curve of a motor. The multiplexer is configured for operatively receiving the parameter voltage. The data control unit is configured for operatively controlling the multiplexer to output the parameter voltage. The analog-to-digital converter is configured for operatively receiving the parameter voltage and converting the parameter voltage to digital form, and then outputting the digital parameter voltage to the data control unit. The register is configured for operatively storing the digital parameter voltage outputted by the data control unit. The controller determines the motor speed curve according to the digital parameter voltage stored in the register, and drives the motor in response to the motor speed curve to avoid a noise generated during a rotation of the motor interfering with the motor. After the register stores the digital parameter voltage, the data control unit outputs a switch signal to the controller, such that the controller enters an operation mode.

In summary, the motor drive circuit and the motor using the same provided by the present disclosure can store the relational parameter voltage into the register before the motor starts to work. Until the input voltage source stops providing the input voltage, the information stored in the register will not be changed. The controller of the motor will drive the motor in response to the motor speed curve which is not influenced by noise. Hence, the motor provides a stable rotation speed because the rotation speed does not drift when the motor is rotating.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
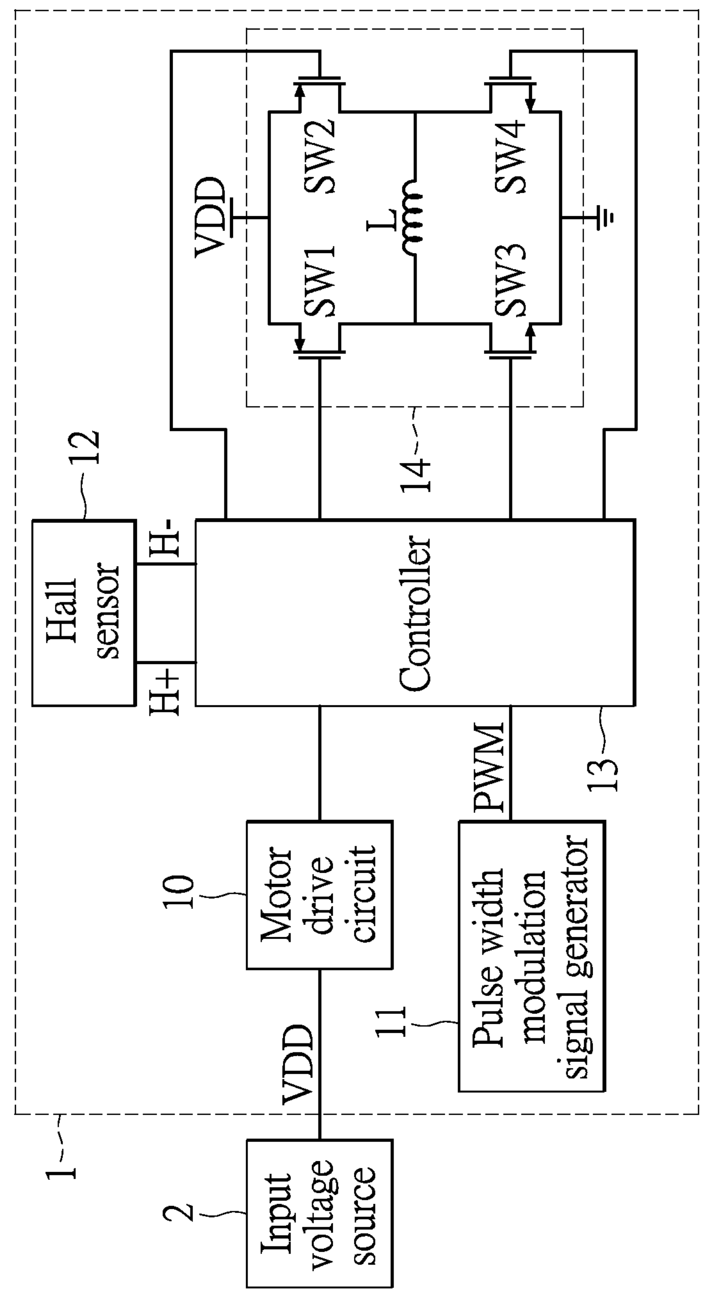
FIG. 1 is a structure diagram of a motor provided in accordance with an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Notably, the terms first, second, third, etc., may be used herein to describe various elements or signals, but these signals should not be affected by such elements or terms. Such terminology is used to distinguish one element from another or a signal with another signal. Further, the term "or" as used herein in the case may include any one or combinations of the associated listed items.

Please refer to FIG. 1. FIG. 1 is a structure diagram of a motor provided in accordance with an exemplary embodiment of the present disclosure. The motor 1 includes a motor drive circuit 10, a pulse width modulation signal generator 11, a Hall sensor 12, a controller 13 and a full bridge circuit 14. The motor drive circuit 10 is coupled to an input voltage source 2 and the controller 13. The pulse width modulation signal generator 11 is coupled to the controller 13. The controller 13 is coupled to the Hall sensor 12 and the full bridge circuit 14. The input voltage source 2 is configured for operatively providing an input voltage VDD to drive the motor 1.

The motor drive circuit 10 comprises suitable logic, circuitry, interfaces and/or code operable to receive the input voltage VDD and determine a motor speed curve. A curve drawn based on the relationship between the duty cycle of the input pulse width modulation signal and the corresponding speed thereof is considered to be the motor speed curve. For example, the vertical axis of the motor speed curve represents the motor speed, and the horizontal axis of the motor speed curve represents the duty cycle of the input pulse width modulation signal.

When the input voltage source 2 starts to provide the input voltage VDD to the motor 1, the motor drive circuit 10 generates at least one parameter voltage in response to the input voltage VDD. The parameter voltage is used to determine the motor speed curve. The motor drive circuit 10 stores the parameter voltage into a register (not shown in FIG. 1), and then the motor 1 starts to work.

The pulse width modulation signal generator 11 comprises suitable logic, circuitry, interfaces and/or code operable to provide the pulse width modulation signal PWM to drive the motor 1. The duty cycle of the pulse width modulation signal PWM can be adjusted based on the system requirements.

The Hall sensor 12 comprises suitable logic, circuitry, interfaces and/or code operable to sense the magnetic pole position of the magnetic pole in a motor rotator (not shown in FIG. 1) of the motor 1, and to generate a first timing signal H+ and a second timing signal H−. Incidentally, those skilled in the art should be able to know that using the Hall sensor 12 to sense the magnetic pole position of the magnetic pole in the motor rotator and generate the timing signals, further description is hereby omitted.

The controller 13 comprises suitable logic, circuitry, interfaces and/or code operable to receive the pulse width modulation signal PWM, the first timing signal H+ and the second timing signal H−, and controls a conducting state of the full bridge circuit 14 based on the duty cycle of the pulse width modulation signal PWM, the first timing signal H+, the second timing signal H− and the motor speed curve provided by the motor drive circuit 10, then the motor 1 is driven.

The full bridge circuit 14 comprises a first switch SW1, a second switch SW2, a third switch SW3, a fourth switch SW4 and a motor load L. The first switch SW1 and the second switch SW2 are coupled to the input voltage source 2 to receive the input voltage VDD. The third switch SW3 and the fourth switch SW4 are coupled to the ground. A first end of the motor load L is connected to the first switch SW1 and the third switch SW3, and a second end of the motor load L is connected to the second switch SW2 and the fourth switch SW4. The gates of the first switch SW1, the second switch SW2, the third switch SW3 and the fourth switch SW4 are respectively connected to the controller 13. Moreover, the two ends of the motor load L are further connected to the motor rotator.

In this embodiment, the first switch SW1 and the second switch SW2 are P-channel MOSFETs, and the third switch SW3 and the fourth switch SW4 are N-channel MOSFETs. The sources of the first switch SW1 and the second switch SW2 are respectively connected to the input voltage source 2, and the drains of the first switch SW1 and the second switch SW2 are respectively connected to the two ends of the motor load L. The drains of the third switch SW3 and the fourth switch SW4 are respectively connected to the two ends of the motor load L, and the sources of the third switch SW3 and the fourth switch SW4 are respectively connected to the ground.

By controlling the conducting states of the first switch SW1, the second switch SW2, the third switch SW3 and the fourth switch SW4, the control unit 13 can properly decrease or increase the voltage provided to the motor rotator and further control the speed of the motor rotator.

While the input voltage source 2 is providing the input voltage VDD, the motor 1 will be operated in accordance with the motor speed curve stored in the motor drive circuit 10. The motor speed curve stored in the motor drive circuit 10 is not influenced by the noise is generated during the rotating of the motor. Hence, the motor 1 can provide a stable rotation speed as long as the motor 1 works according to the motor speed curve stored in the motor drive circuit 10.

In addition, the motor 1 can be used in a heat-dissipating fan or other electric device, and the use thereof is not limited herein.

Figure 2:
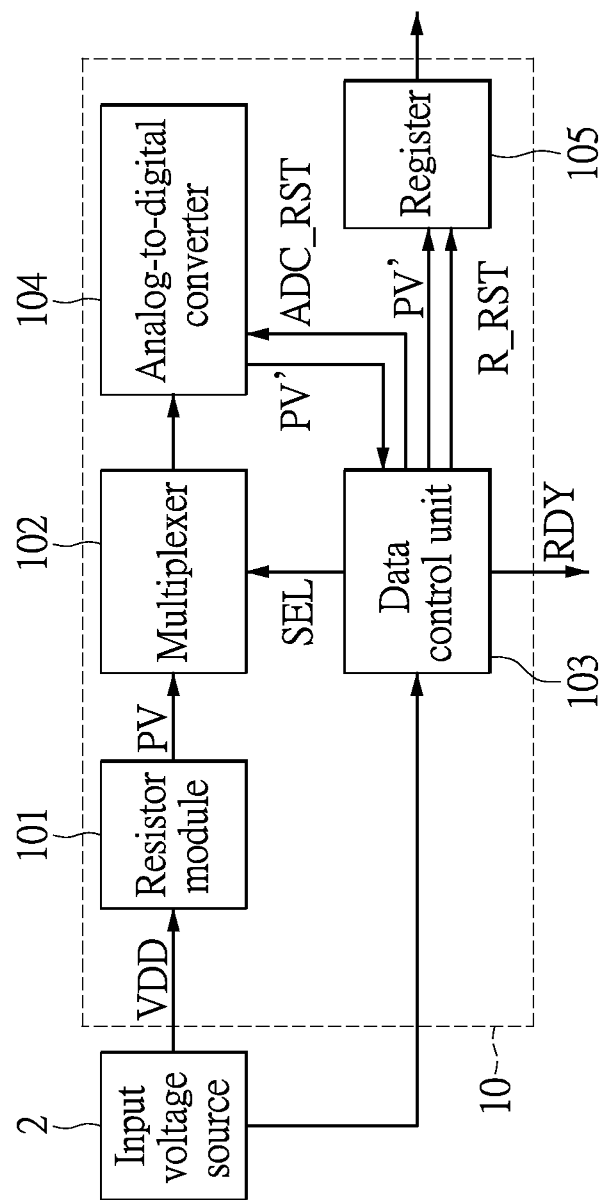
FIG. 2 is a structure diagram of a motor drive circuit provided in accordance with an exemplary embodiment of the present disclosure.

The following description is to further illustrate the structure and the working principle of the motor drive circuit 10. Please refer to FIG. 2. FIG. 2 is a structure diagram of a motor drive circuit provided in accordance with an exemplary embodiment of the present disclosure. The motor drive circuit 10 includes a resistor module 101, a multiplexer 102, a data control unit 103, an analog-to-digital converter 104 and a register 105. The resistor module 101 is coupled to the input voltage source 2. The multiplexer 102 is coupled to the resistor module 101. The data control unit 103 is coupled to the multiplexer 102. The analog-to-digital converter 104 is coupled to the multiplexer 102 and the data control unit 103. The register 105 is coupled to the data control unit 103.

The resistor module 101 comprises suitable logic, circuitry, interfaces and/or code operable to receive the input voltage VDD provided by the input voltage source 2, and generates at least one parameter voltage PV. The parameter voltage PV is associated with the motor speed curve of the motor 1.

The resistor module 101 is composed of a plurality of resistors and forms a resistor network. By designing resistance values of each resistor of the resistor module 101, the resistor module 101 can control the voltage value of the parameter voltage PV, and further generate a corresponding motor speed curve.

Figure 3:
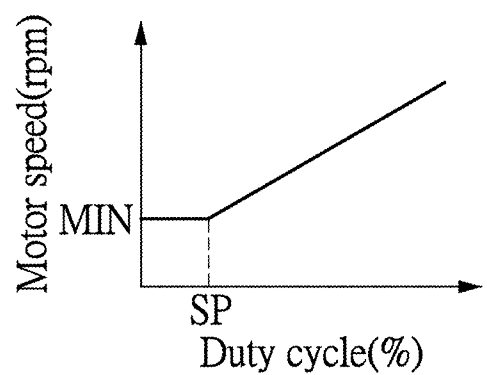
FIG. 3 is a schematic diagram of a motor speed curve in accordance with an exemplary embodiment of the present disclosure.

In order to further illustrate the instant disclosure, please refer to FIG. 3. FIG. 3 is a schematic diagram of a motor speed curve in accordance with an exemplary embodiment of the present disclosure. The horizontal axis in FIG. 3 represents the duty cycle of the pulse width modulation signal PWM input to the controller 13, and the vertical axis in FIG. 3 represents the motor speed (rpm).

The parameter voltage PV comprises a speed voltage MIN or a pulse width voltage SP. The speed voltage MIN relates to the initial speed of the motor 1 in the motor speed curve (that is, the origin of the motor speed curve on the vertical axis). The pulse width voltage SP relates to the initial duty cycle of the first pulse width modulation signal PWM in the motor speed curve (that is, the origin of the motor speed curve on the horizontal axis). In other words, the shape of the motor speed curve changes with the voltages of the speed voltage MIN and the pulse width voltage SP. If neither the speed voltage MIN nor the pulse width voltage SP is equal to 0, the shape of the motor speed curve is just like that shown in FIG. 3.

The parameter voltage PV is relevant to a slope of the motor speed curve, meaning that the slope of the motor speed curve is affected by the parameter voltage PV. In brief, the shape of the motor speed curve changes along with the voltage value of the parameter voltage PV. The present disclosure does not limit the type and number of the parameter voltage PC. Those skilled in the art can design the resistor module 101 based on need to make the resistor module 101 generate the parameter voltage PV and change the shape of the motor speed curve.

The resistors of the resistor module 101 can be designed in advance during the production process. Moreover, these resistors can be variable resistors so that the resistor module 101 can adjust the resistances of these resistors based on need to generate different parameter voltage PV. Furthermore, because of the low cost of the resistors, those skilled in the art can adjust the parameter voltage PV by replacing the resistors with different resistances.

Please again refer to FIG. 2. The multiplexer 102 comprises suitable logic, circuitry, interfaces and/or code operable to receive the parameter voltage PV, and selectively outputs the parameter voltage PV to the analog-to-digital converter 104.

The data control unit 103 comprises suitable logic, circuitry, interfaces and/or code operable to control the multiplexer 102 to output the parameter voltage PV to the analog-to-digital converter 104.

The analog-to-digital converter 104 comprises suitable logic, circuitry, interfaces and/or code operable to receive the parameter voltage PV and convert the parameter voltage PV to digital form. Then, the analog-to-digital converter 104 transmits the digital parameter voltage PV' to the data control unit 103.

The register 105 comprises suitable logic, circuitry, interfaces and/or code operable to store the digital parameter voltage PV'.

Figure 4:
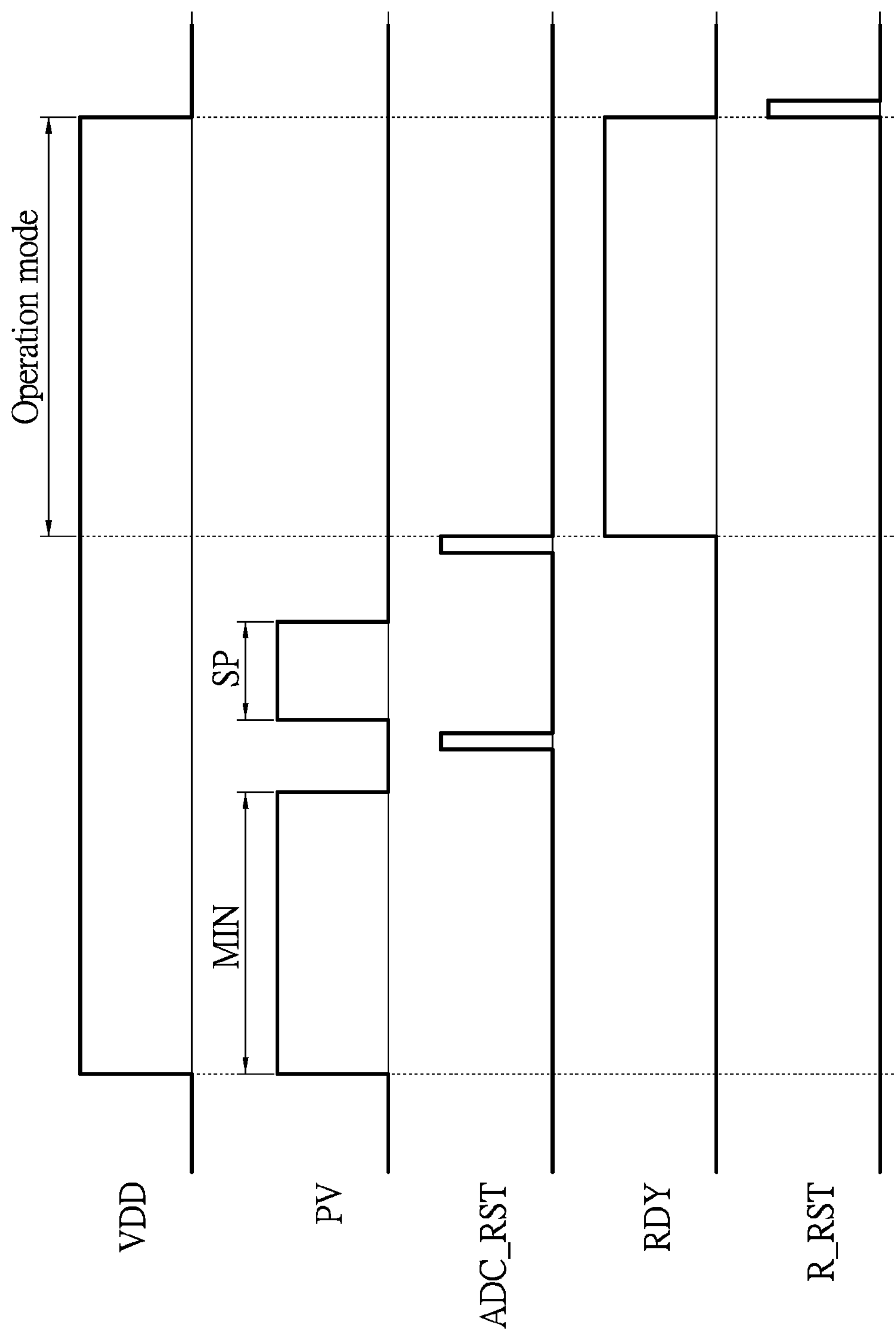
FIG. 4 is an operating waveform of a motor drive circuit in accordance with an exemplary embodiment of the present disclosure.

The following description is to further illustrate the motor drive circuit 10 in conjunction with a waveform. Please refer to FIG. 4. FIG. 4 is an operating waveform of a motor drive circuit in accordance with an exemplary embodiment of the present disclosure. As in the above descriptions, the input voltage source 2 provides the input voltage VDD to make the motor 1 work.

First, the resistor module 101 of the motor drive circuit 10 receives the input voltage VDD, and outputs the parameter voltage PV to the multiplexer 102. One embodiment of the present disclosure is exemplified by, but not limited to, the resistor module 101 outputs the speed voltage MIN and the pulse width voltage SP through different pins as the parameter voltage PV.

Next, the data control unit 103 outputs a select signal SEL corresponding to the speed voltage MIN to the multiplexer 102, such that the multiplexer 102 outputs the speed voltage MIN to the analog-to-digital converter 104. The analog-to-digital converter 104 converts the speed voltage MN to digital form, and then transmits the digital speed voltage MIN' to the data control unit 103.

After receiving the digital speed voltage MIN', the data control unit 103 outputs the digital speed voltage MIN' to the register 105, and the register 105 stores the digital speed voltage MIN'. On the other hand, after receiving the digital speed voltage MIN', the data control unit 103 outputs a first reset signal ADC_RST to the analog-to-digital converter 104 to reset information stored in the analog-to-digital converter 104.

Next, the data control unit 103 outputs a select signal SEL corresponding to the pulse width voltage SP to the multiplexer 102, such that the multiplexer 102 outputs the pulse width voltage SP to the analog-to-digital converter 104. The analog-to-digital converter 104 converts the pulse width voltage SP to digital form, and then transmits the digital pulse width voltage SP' to the data control unit 103.

Similarly, after receiving the digital pulse width voltage SP', the data control unit 103 outputs the digital pulse width voltage SP' to the register 105, and the register 105 stores the digital pulse width voltage SP'. On the other hand, after receiving the digital pulse width voltage SP', the data control unit 103 outputs the first reset signal ADC_RST to the analog-to-digital converter 104 to reset information stored in the analog-to-digital converter 104.

When the register 105 stores all of the digital parameter voltage PV' (such as the above mentioned digital speed voltage MIN' and the digital pulse width voltage SP'), the data control unit 103 outputs a switch signal RDY to the controller (such as the controller 13 shown in FIG. 1), such that the controller 13 enters an operation mode.

When the controller 13 enters the operation mode, the controller 13 determines the motor speed curve in response to the digital parameter voltage stored in the register, and controls the conducting state of the full bridge circuit 14 based on the motor speed curve, the pulse width modulation signal PWM, the first timing signal H+ and the second timing signal H− to drive the motor 1.

When the input voltage source 2 stops providing the input voltage VDD, meaning the work of the motor 1 has finished, the data control unit 103 outputs a second reset signal R_RST to the register 105 to reset information stored in the register 105. When the input voltage source 2 again provides the input voltage VDD to the motor drive circuit 10, the motor drive circuit 10 repeats the above steps, such that the register 105 stores all of the digital parameters of voltage PV'. Then, the motor 1 works based on the motor speed curve.

In summary, the motor drive circuit and the motor using the same provided by the present disclosure can store the relational parameter voltage into the register before the motor starts to work. Until the input voltage source stops providing the input voltage, because the information stored in the register has not changed, the controller of the motor will drive the motor in response to the motor speed curve, which is not influenced by noise. Hence, the motor provides a stable rotation speed because the rotation speed does not drift when the motor is rotating.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A motor drive circuit, comprising:
a resistor module, configured for operatively receiving an input voltage, and generating at least one parameter voltage, wherein the parameter voltage is configured for operatively determining a motor speed curve of a motor;
a multiplexer coupled to the resistor module, configured for operatively receiving the parameter voltage;
a data control unit coupled to the multiplexer, configured for operatively controlling the multiplexer to output the parameter voltage;
an analog-to-digital converter coupled to the multiplexer and the data control unit, configured for operatively receiving the parameter voltage and converting the parameter voltage to digital form, and then outputting the digital parameter voltage to the data control unit; and
a register coupled to the data control unit, configured for operatively storing the digital parameter voltage outputted by the data control unit;
wherein a controller determines the motor speed curve according to the digital parameter voltage stored in the register, and drives the motor in response to the motor speed curve to avoid noise generated during rotation of the motor from interfering with the motor;
wherein after the register stores the digital parameter voltage, the data control unit outputs a switch signal to the controller, such that the controller enters an operation mode.

2. The motor drive circuit according to claim 1, wherein the data control unit outputs a select signal to the multiplexer to control the multiplexer outputting the parameter voltage to the analog-to-digital converter.

3. The motor drive circuit according to claim 1, wherein the data control unit receives the digital parameter voltage, and outputs a first reset signal to the analog-to-digital converter to reset the analog-to-digital converter.

4. The motor drive circuit according to claim 1, wherein when the controller enters the operation mode, the controller determines the motor speed curve in response to the digital parameter voltage stored in the register, and controls a full bridge circuit based on the motor speed curve.

5. The motor drive circuit according to claim 4, wherein the full bridge circuit comprises a first switch, a second switch, a third switch and a fourth switch, the first switch and the second switch are coupled to an input voltage resource, the third switch and the fourth switch are coupled to a ground, and gates of the first switch, the second switch, the third switch and the fourth switch are respectively coupled the controller, wherein conducting states of the first switch, the second switch, the third switch and the fourth switch are associated with a working state of the motor.

6. The motor drive circuit according to claim 1, wherein when the input voltage stops providing the input voltage to the motor drive circuit, the data control unit outputs a second reset signal to the register to reset the register.

7. A motor, comprising:
a motor drive circuit, comprising:
a resistor module, configured for operatively receiving an input voltage, and generating at least one parameter voltage, wherein the parameter voltage is configured for operatively determining a motor speed curve of a motor;
a multiplexer coupled to the resistor module, configured for operatively receiving the parameter voltage;
a data control unit coupled to the multiplexer, configured for operatively controlling the multiplexer to output the parameter voltage;
an analog-to-digital converter coupled to the multiplexer and the data control unit, configured for operatively receiving the parameter voltage and converting the parameter voltage to digital form, and then outputting the digital parameter voltage to the data control unit; and
a register coupled to the data control unit, configured for operatively storing the digital parameter voltage outputted by the data control unit;
a controller coupled to the data control unit and the register, configured for operatively determining the motor speed curve according to the digital parameter voltage stored in the register, and driving the motor in response to the motor speed curve to avoid a noise generated during a rotation of the motor interfering with the motor;
wherein after the register stores the digital parameter voltage, the data control unit outputs a switch signal to the controller, such that the controller enters an operation mode.

8. The motor according to claim 7, wherein the data control unit outputs a select signal to the multiplexer to control the multiplexer outputting the parameter voltage to the analog-to-digital converter.

9. The motor according to claim 7, wherein the data control unit receives the digital parameter voltage, and outputs a first reset signal to the analog-to-digital converter to reset the analog-to-digital converter.

10. The motor according to claim 7, wherein when the controller enters the operation mode, the controller determines the motor speed curve in response to the digital parameter voltage stored in the register, and controls a full bridge circuit based on the motor speed curve.

11. The motor according to claim 10, wherein the full bridge circuit comprises a first switch, a second switch, a third switch and a fourth switch, the first switch and the second switch are coupled to a input voltage resource, the third switch and the fourth switch are coupled to a ground, and gates of the first switch, the second switch, the third switch and the fourth switch are respectively coupled to the controller, wherein conducting states of the first switch, the second switch, the third switch and the fourth switch are associated with a working state of the motor.

12. The motor according to claim 7, wherein when the input voltage stops providing the input voltage to the motor drive circuit, the data control unit outputs a second reset signal to the register to reset the register.

* * * * *